Patented June 9, 1925.

UNITED STATES PATENT OFFICE.

CAMILLE CLERC AND ARMAND NIHOUL, OF PARIS, FRANCE.

MANUFACTURE OF MAGNESIA FROM DOLOMITE.

No Drawing.     Application filed December 14, 1921. Serial No. 522,366.

*To all whom it may concern:*

Be it known that we, CAMILLE CLERC, a citizen of France, and a resident of Paris, France, and ARMAND NIHOUL, a subject of the King of Belgium, and a resident of Paris, France, have invented certain new and useful Improvements in the Manufacture of Magnesia from Dolomite; and we do hereby declare the following to be a full, clear, and exact description of the invention, such as will enable others skilled in the art to which it appertains to make and use the same.

The manufacture of magnesia from dolomite has been practised by taking advantage of the action of a suspension of lime and magnesia on a solution of magnesium chloride; two reactions occur, namely—

No. 1. 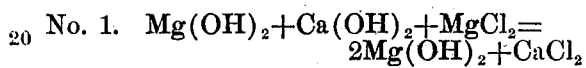

The magnesium chloride is regenerated in accordance with the equation:

No. 2. 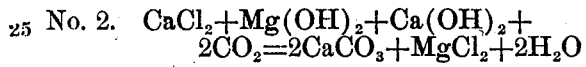

The process, however, yields an impure magnesia, because the latter contains all the unburnt portions and foreign matter existing in the burnt dolomite.

On the other hand, the precipitated magnesia is in great part in a colloidal condition, because a portion of the magnesia is hydrated owing to the fact that it has been produced by the action of lime in solution on the magnesium chloride. It is difficult to filter this colloidal magnesia and almost impossible to wash it free from the calcium chloride formed.

The present invention relates to a process for making magnesia from dolomite, which avoids the foregoing objections by conducting the operation in the following manner: in the first place, the impurities contained in the dolomite are separated as completely as possible, so that they cannot render impure the magnesia produced; in the second place, the process avoids the formation of hydrated magnesia or colloidal magnesia almost completely, by avoiding prolonged contact of the magnesia with water, and the dissolution of the lime.

The end in view might be obtained by finely grinding the mixture of lime and magnesia and adding it progressively to an excess of magnesium chloride solution. Under these conditions the lime would combine at once with magnesium chloride without dissolving and would subsequently form a precipitate of magnesia little hydrated and easily filtered.

Such procedure, however, would necessitate a consumption of power for grinding, and since the whole mass must be ground at the same time, the unburnt portions (calcium and magnesium carbonates) and fragments of siliceous nodules or silicates existing in the burnt dolomite would pass into the magnesia finally obtained, diminishing the value of the product.

The process according to the invention is conducted as follows:

The mixture of lime and magnesia (CaO+MgO) should be made by calcining the dolomite at a temperature higher than is necessary for merely decarbonating it; this temperature should be sufficiently high to ensure that the magnesia will be hydrated subsequently only with difficulty, without, however, attaining the temperature at which the lime passes into the condition wherein its hydration is delayed. For this purpose the dolomite may be calclined in a lime kiln such as is ordinarily used at the sugar factory, having a pump for withdrawing the carbon dioxide; by suitably proportioning the quantity of gas withdrawn and the quantities of dolomite and fuel charged to the kiln, the hottest zone of the kiln can easily be maintained at the temperature (1000°– 1200° C.) necessary for obtaining the lime magnesia mixture burnt to the desired degree.

This mixture is then slaked with a proportion of water sufficient (about 20 per cent of the weight of the CaO) to cause it to swell and to hydrate only incompletely the lime without hydrating the magnesia, or bringing the lime into solution.

The water may be advantageously replaced by an appropriate saline solution, for example a solution of calcium chloride, such as the one obtained by filtering or washing the magnesia.

Experiments have shown that good results are obtained with a solution of calcium chloride, the weight of which is 20% of that of the lime.

This way of operating avoids the dilution of the solutions employed, since the partial slaking of the lime by means of these solutions has for its result to concentrate them; and almost, the object in view, that is to say the swelling of the mixture of lime and magnesia without hydrating the magnesia and with an only partial hydration of lime without dissolving it, is much better obtained than it is the case with water; the chemical properties of a solution of calcium chloride being more favourable than that of water in order to obtain such result.

These modes of slaking the mixture of lime and magnesia reduce it to powder; it is then sifted so that unburnt portions and fragments of silica are removed; finally, it is added by degrees to and mixed with the magnesium chloride in the shortest possible time so as not to hydrate the magnesia, with which object an excess of the solution of magnesium chloride is used, that is to say the proportion is such that there is present only about three-quarters of the lime necessary to react with the magnesium chloride. By producing in this manner, the magnesia is obtained in a granular condition, easily filtered.

The process may be carried out by introducing the mixture of lime and magnesia into a rotary sieve or on to a vibrating riddle, together with the quantity of water strictly necessary for producing increase of bulk by partial hydration of the lime. The rotation or vibration of the sieve completes the swelling action and reduces the lime-magnesia to powder; a large part passes through the sieve; those portions which do not pass, containing principally the unburnt portions, the siliceous nodules and the like, are used for preparing the suspension of lime and magnesia required in the reaction expressed by equation No. 2 above, whereby the magnesium chloride is regenerated; in this manner these portions are used without making impure the magnesia produced according to the equation No. 1.

The sifted lime-magnesia powder is then introduced gradually into a mixer containing an excess of magnesium chloride solution. The magnesia which is precipitated rapidly by action of the solid lime, which is incompletely hydrated, on the excess of magnesium chloride is obtained in the form of a granular precipitate, easily filtered and washed.

The process thus has the advantage of eliminating the unburnt portions, the silicates and silica, since they are not ground and do not pass through the sieve, and at the same time produces a granular precipitate of magnesia.

As to the reaction expressed by equation No. 2, which has the object of regenerating magnesium chloride, it has been found that by diluting the solution of calcium chloride to a dilution between 6° and 12° Baumé, about, a satisfactory result is obtained.

A quite special or efficient mode of making magnesia by means of the procedure hereinbefore described, consists in using the waste liquor or ammoniacal liquor from the manufacture of soda by the ammonia-soda process of Solvay.

These waste liquors contain a large quantity of calcium chloride. By adding to the liquor the mixture of lime and magnesia in suitable quantity and introducing carbon dioxide, the following reaction, identical with that expressed by equation 2 above, is produced—

$$CaCl_2 + MgO + CaO + 2CO_2 = 2CaCO_3 + MgCl_2$$

The precipitated calcium carbonate can be easily separated from the solution of magnesium chloride; the latter is then treated with the mixture of lime and magnesia as has been already indicated, that is to say by adding gradually the lime-magnesia purified and reduced to powder by slaking and sieving, and avoiding hydration of the magnesia by keeping the magnesium chloride in excess. Under these conditions the magnesia is precipitated in granular form, which is easily separated from the liquor, the reaction being expressed by the equation—

$$MgCl_2 + MgO + CaO = 2MgO + CaCl_2$$

In the residual liquor, the magnesium chloride is regenerated in the manner already explained. There is the advantage that the magnesia is produced without any cost for the chlorine, that which is lost in the washing waters being made good without cost by that which is contained in the waste liquor.

It is also possible to use for the manufacture of magnesia by this process the ammoniacal liquor produced in the Solvay process after the sodium bicarbonate has been precipitated. In this case it is necessary on the one hand to purify, as a preliminary step, the ammoniacal liquor from sulphates and carbonates of ammonia which it contains, and on the other hand to burn the dolomite and treat it so that the magnesia is obtained at a high degree of strength and can easily be separated from the ammoniacal solution.

To extract the magnesia by means of the ammoniacal liquor from the manufacture of soda by the ammonia-soda process, there is utilized on the one hand the property which the chlorides of calcium, barium or the like have of decomposing ammonium carbonates and sulphates with formation of ammonium chloride and precipitation of insoluble carbonates or sulphates; on the other hand, the process which is the object of this invention already described, whereby the mixture of lime and magnesia is obtained nearly pure and in a physical state that allows its easy recovery by action of the mixture of lime and magnesia on the magnesium chloride under the conditions indicated.

The ammoniacal liquor obtained in the ammonia-soda process, after precipitation of the sodium bicarbonate, contains not only chlorides of ammonium and sodium but also carbonates, bicarbonates and sulphates of ammonium. It is essential to eliminate these, for their presence would have the effect of diminishing the percentage content of the product in magnesia. The ammoniacal liquor is mixed with a soluble chloride, the base of which forms insoluble sulphate and carbonate, for instance barium chloride or calcium chloride. When this latter is to be used it is economical to add to the ammoniacal liquor a suitable proportion of the waste liquor from the manufacture of the soda, for such liquor contains calcium chloride, but it is a condition that the waste liquor should be first neutralized with hydrochloric acid because it contains an excess of lime which might cause loss of ammonia. The addition of the waste liquor to the ammoniacal liquor produces a precipitate which should be separated; after having been thus purified the ammoniacal liquor can be used to form the magnesia by the process of this invention.

Instead of using lime alone, as in the ammonia-soda process, for displacing the ammonia in the ammoniacal liquor which is produced by the separation of the bicarbonate of soda, there may be used the mixture of lime and magnesia, and instead of the reaction expressed by the equation:—

$$2NH_4Cl + Ca(OH)_2 = CaCl_2 + 2NH_3 + 2H_2O$$

there is obtained the reaction expressed by the equation—

1ª. $4NH_4Cl + Ca(OH)_2 + Mg(OH)_2 =$
$CaCl_2 + MgCl_2 + 2H_2O + 4NH_3$

Should there be used an excess of the mixture of lime and magnesia, there remains a solid residue of undissolved magnesia which is separated by filteration or in other known manner. The waste liquor from this operation, after ammonia has been distilled, contains magnesium chloride; it is treated with a fresh quantity of mixture of lime and magnesia to produce the reaction expressed by the equation 2ª—

$$CaCl_2 + MgCl_2 + CaO + MgO = 2CaCl_2 + 2MgO$$

It then suffices to separate the precipitate of magnesia from the solution of calcium chloride by a suitable method (decantation, filteration or the like).

In order that these operations may be easily carried out, it is indispensable that the action of lime and magnesia (equation 2ª) should occur under the conditions already described, in order that the magnesia produced may be readily separated from the solution in which it is suspended; that is to say the dolomite should be burnt during several hours at a high temperature, it should then be reduced to powder by partial hydration of the lime only and sieving on a rotary or vibratory sieve, thus being separated from the unburnt portions, nodules and the like, and finally added gradually, while mixing, to an excess of the solution containing the magnesium chloride, so that the free lime reacts at once with the latter without dissolving and sufficiently rapidly to avoid hydration of the magnesia.

It is obvious that the mode of operation indicated above could be modified, and that according to the nature of the material used for distilling the ammonia it may be advisable to proceed in a different manner. For example, in certain cases, it will be advisable to distil the ammonia with use of the magnesia obtained in the previous operations instead of with use of the mixture of lime and magnesia; in this case, the reaction expressed by the following equation (1ᵇ) will occur—

$2NH_4Cl + Mg(OH)_2 =$
$MgCl_2 + 2NH_3 + 2H_2O$

It will then suffice to treat the waste liquor from this process with a suitable quantity of the mixture of lime and magnesia to obtain magnesia and calcium chloride, which will be separated by a suitable method (filteration, decantation or the like).

In other cases, on the contrary, it will be advisable to add to the ammoniacal liquor such a quantity of lime and magnesia that the weight of the lime contained in it suffices alone for the displacement of the whole of the ammonia in accordance with the following equation—

3. $Ca(OH)_2 + Mg(OH)_2 + 2NH_4Cl =$
$CaCl_2 + Mg(OH)_2 + 2NH_3 + 2H_2O$

When operating in this manner, the magnesia is obtained by simple dissolution of the lime. At the same time in this case a part of the magnesia may become hydrated and render filtration very difficult. To minimize this inconvenience, the mixture of lime and magnesia added to the ammoniacal liquor should have been made by burning the dolomite for several hours at a high temperature (1000°–1200° C.) and then partially slaking it by means of a spray of water in quantity just sufficient to bring about the swelling of the mass by an incomplete hydration of the lime; finally, the mass is sieved to bring about its pulverization and to eliminate the unburnt particles and fragments of siliceous material which it contains.

Having now particularly described and ascertained the nature of our said invention and in what manner the same is to be performed, we declare that what we claim is:

1. The process, which comprises calcining dolomite at a temperature above that necessary for decarbonation and sufficiently high to make hydration of the magnesia difficult without preventing hydration of the lime, swelling the lime-magnesia mixture without completely hydrating the lime or dissolving the same separating the powder thus formed from the non-hydratable portion, and mixing the powder obtained with an excess of magnesium chloride to rapidly precipitate the partially hydrated magnesia in a readily filterable granular form.

2. The process, which comprises calcining dolomite at temperatures between 1000° and 1200° C., swelling the lime-magnsia mixture thus obtained by water sufficient to only incompletely hydrate the lime, separating the powder thus formed by sifting from impure magnesia comprising non-hydratable portions, mixing the powder with an excess of a solution of magnesium chloride, washing and filtering the precipitated magnesium hydrate and regenerating the magnesium chloride solution by the residue from the separation of said powder while passing a current of carbon dioxide through the filtrate.

In testimony that we claim the foregoing as our invention, we have signed our names hereto.

CAMILLE CLERC.
ARMAND NIHOUL.